United States Patent Office 2,946,142
Patented July 26, 1960

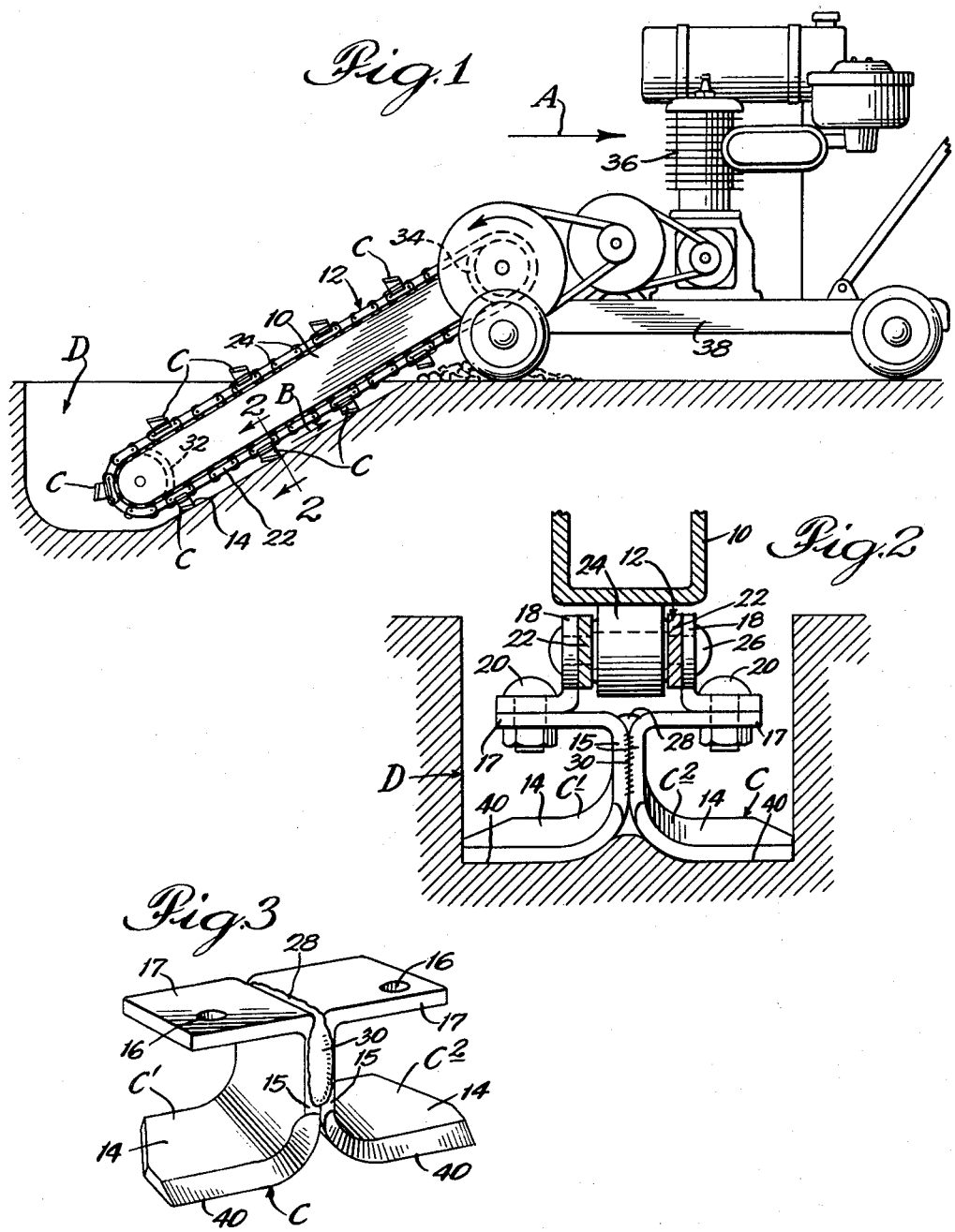

2,946,142

TRENCHING MACHINE CUTTER

Russel Swanson, Merrill, Iowa, assignor to Wind-King Electric Mfg. Co., Merrill, Iowa, a corporation of Iowa Filed Sept. 9, 1957, Ser. No. 682,778

2 Claims. (Cl. 37—80)

My present invention relates to improvements in cutters for trenching machines and particularly the small type used by home owners and the like for installing underground electric wiring, gas lines, lawn sprinklers, etc.

One object of the invention is to provide a cutter which is efficient in use, economical to manufacture, smooth in operation and which will not bind in the ditch being dug.

Another object is to provide a cutter which is balanced in action, each cutter cutting the full width of the ditch as distinguished from those types of cutters which are alternately right-hand and left-hand so that the cutters cut opposite sides of the ditch, my cutter thereby producing the smooth operation desired and effecting the elimination of binding in the ditch during the cutting action.

Still another object is to provide a cutter that is effectively operable in frozen or very hard ground due to the small amount of metal rubbing on the sides of the ditch and the balanced action above referred to.

A further object is to provide a cutter particularly adapted for a small trenching boom having an endless chain trained around a pair of sprockets carried thereby, the cutter being removably mounted on the digger chain by bolting it to special links thereof.

Still a further object is to provide a cutter so designed that the usual binding in the ditch due to clearance of the cutter wearing away is avoided.

With these and other objects in view, my invention consists in the construction, arrangement and combination of the various parts of my trenching machine cutter, whereby the objects above contemplated are attained, as hereinafter more fully set forth, pointed out in my claims and illustrated in detail on the accompanying drawing, wherein:

Fig. 1 is a side elevation of a trenching machine with a plurality of my trenching machine cutters mounted on the digger chain thereof;

Fig. 2 is an enlarged sectional view (about full size) on the line 2—2 of Fig. 1; and Fig. 3 is a full size perspective view of one of my trenching machine cutters.

On the accompanying drawing I have used the reference numeral 10 to indicate a trenching boom and 12 a digger chain. The digger chain 12 consists of a series of plain chain links 22 and special L-shaped mounting links 18 together with the usual chain rollers 24 and chain pins 26. Sprockets 32 and 34 are journalled with respect to the boom 10 and the digger chain 12 is trained around them. The boom 10 is suitably mounted on a wheeled frame 38 on which is an internal combustion engine 36 or other suitable prime mover which is suitably geared down to drive the sprocket 34 at a relatively low speed suitable for operating the digger chain 12. The engine 36, the frame 38 and the operative connecting mechanism between the engine 36 and the sprocket 34 are shown diagrammatically as they form no part of my present invention which is concerned with a trenching machine cutter shown generally at C.

The trenching machine cutter C is shown per se in Fig. 3 and a plurality of them are shown mounted on the chain 12 in Fig. 1. Each cutter C comprises two similar but right-hand and left-hand parts $C^1$ and $C^2$ formed of strap steel or the like and each is generally U-shaped, having an outer cutter portion 14, a leg portion 15 and a mounting flange 17. The leg portions 15 are welded together as indicated at 30 and the mounting flanges 17 are welded together as indicated at 28 whereby a substantially integral cutter C is provided.

The flanges 17 are provided with mounting holes 16 adapted to receive bolts 20 which bolts are carried by the special mounting links 18 of the digger chain 12 as shown particularly in Fig. 2. The outer portions 14 of the cutter C have their leading edges sharpened as indicated at 40 and the sharpening preferably extends part way up the leg 15. As shown in Fig. 1 the cutter portions 14 are formed at an angle to the flanges 17 so that their rear edges are higher than their leading edges (in respect to the bottom of the ditch being dug) to provide heel clearance for the cutter both initially and as the cutter wears from use.

Referring to Fig. 2 a ditch D is being dug in the ground by the cutters C and each cutter cuts the sides of the ditch to the full width as determined by the opposite extremities of the cutter portions 14. The sharpened portions 40, of course, cut the bottom of the ditch and the cutting action is progressive as the frame 38 is pulled in the direction of the arrow A (Fig. 1) while the digger chain travels in the direction of the arrow B. Since each cutter C cuts the complete width of the ditch, there is no binding action as when alternate cutters for opposite sides of the ditch are spaced along a chain as shown for instance in the Geithle Patent No. 1,745,090.

My cutter is so designed that it can be resharpened many times, thus having a relatively long life, and may be readily replaced inexpensively with a new cutter whenever it is worn beyond economical use.

Some changes may be made in the construction and arrangement of the parts of my cutter for trenching machines without departing from the real spirit and purpose of my invention, and it is my intention to cover by my claims any modified forms of structure or use of mechanical equivalents which may reasonably be included within their scope.

I claim as my invention:

1. For use in a trenching machine having a boom arranged to extend rearwardly and downwardly therefrom into the earth and having an endless driven digger chain surrounding the boom and trained about the ends thereof, said digger chain having special L-shaped links at spaced intervals therealong; trenching machine cutters adapted to be mounted on said digger chain and each comprising a pair of U-shaped strap elements only secured together intermediate their length and thereby providing upper mounting flanges and lower digging flanges which are substantially parallel to each other in a lateral direction, and means for mounting said mounting flanges on said L-shaped links of the digger chain, said digging flanges having their leading edges sharpened for digging.

2. For use in a trenching machine having a digger chain, said digger chain having special L-shaped links at spaced intervals therealong; trenching machine cutters adapted to be mounted on said digger chain at spaced points therealong, each cutter comprising a pair of U-shaped strap elements having their intermediate portions welded together and thereby providing a one-piece cutter having upper mounting flanges extending away from each other and lower digging flanges also extending away from each other, and means for mounting said mounting flanges on the digger chain comprising a single bolt through each mounting flange and its associate L-shaped link, said bolt being adjacent the leading edge of said cutter, said digging flanges having their leading edges sharpened and formed at an angle relative to said mounting flanges in the direction of travel of said cutters for providing heel clearance.

References Cited in the file of this patent

UNITED STATES PATENTS

| | | |
|---|---|---|
| 1,397,679 | Dunlap | Nov. 22, 1921 |
| 1,745,090 | Geithle | Jan. 28, 1930 |
| 1,886,382 | Dunlap | Nov. 8, 1932 |
| 2,472,758 | Przybylski | June 7, 1949 |
| 2,780,014 | Arps | Feb. 5, 1957 |

FOREIGN PATENTS

| | | |
|---|---|---|
| 25,087 | Great Britain | 1904 |